Feb. 21, 1950 — G. A. LYON — 2,497,897
WHEEL COVER
Filed Aug. 27, 1945
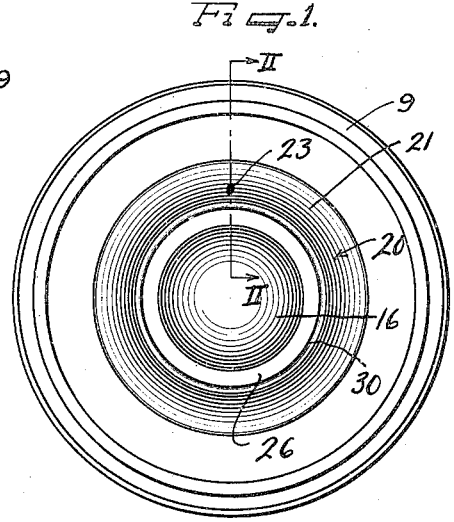
Fig. 1.
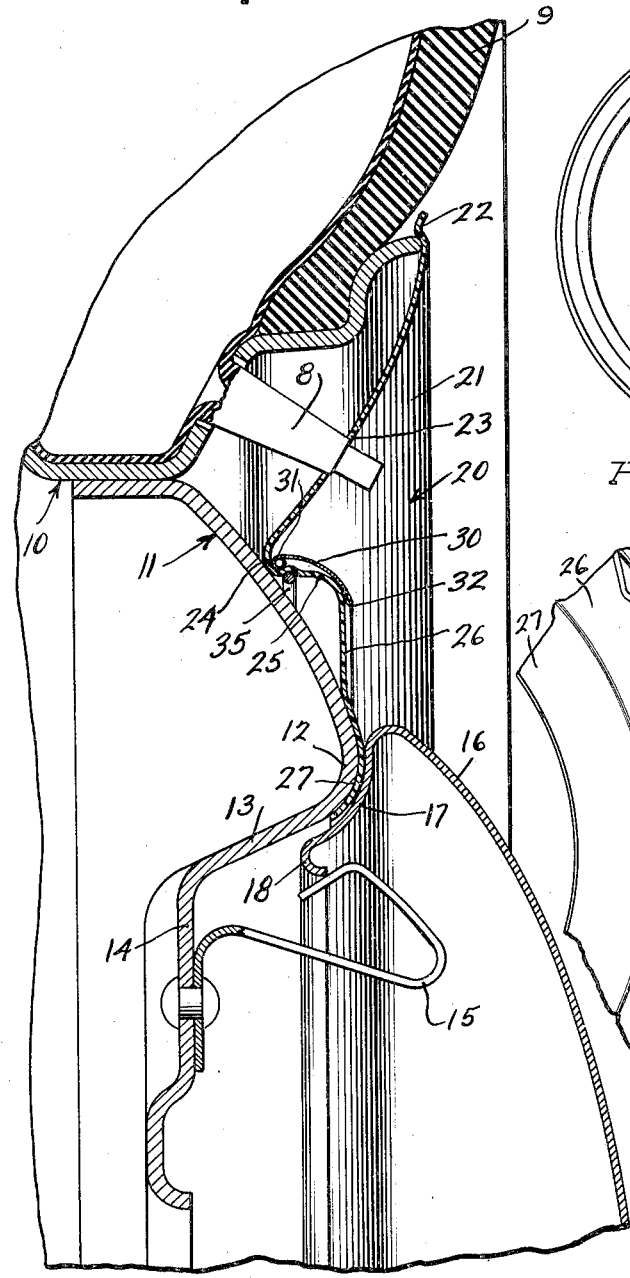
Fig. 2.
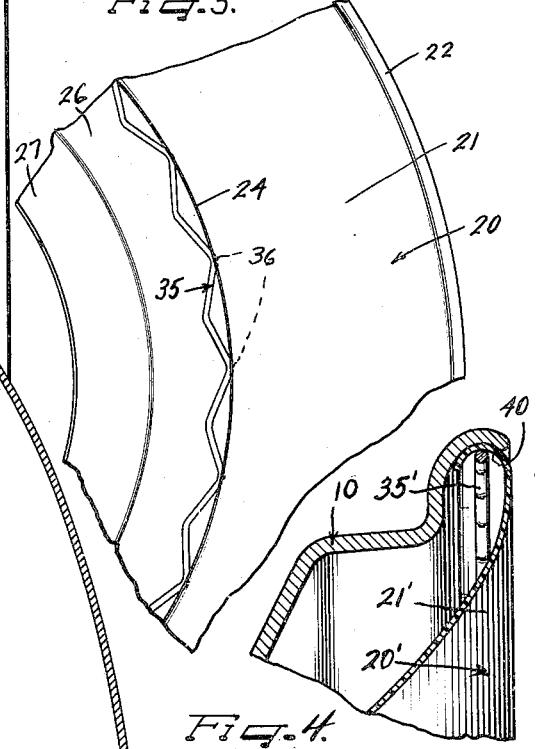
Fig. 3.
Fig. 4.
Inventor
GEORGE ALBERT LYON
by The Firm of Charles W. Hills Attys.

Patented Feb. 21, 1950

2,497,897

UNITED STATES PATENT OFFICE 2,497,897

WHEEL COVER

George Albert Lyon, Allenhurst, N. J.

Application August 27, 1945, Serial No. 612,844

10 Claims. (Cl. 301—37)

This invention relates to a wheel structure and more particularly to ornamental covers for automobile wheels.

An object of this invention relates to the provision of improved means for stressing a portion of a resiliently pliable cover into retaining cooperation with another part.

Another object of this invention relates to the provision of a very simple means for holding an ornamental metal bead on a plastic wheel cover.

A further object of this invention is to provide a simple undulated wire ring for holding a portion of a cover in cooperation with another part through stressing of the portion toward and against that part.

In accordance with the general features of this invention there is provided a cover for a wheel comprising a circular member having a generally axially extending annular portion made of resiliently pliable material manually deflectable without permanent deformation and an undulated continuous circular wire on the under surface of the annular portion for resiliently stressing the same in a generally radial direction for attaching said portion to another part.

Still another feature of the invention relates to the provision in the aforesaid cover of an ornamental bead held on by the stressing of the cover portion and more particularly by points of the portion being stressed or deflected into retaining cooperation with an edge of the bead.

It should be noted that the present subject-matter constitutes a continuation-in-part of that disclosed in my copending application, Serial No. 508,469, filed November 1, 1943, now abandoned and more particularly in Figures 4, 5 and 6 of that application.

Other objects and features of this invention will more fully appear from the following detailed description taken in connection with the accompanying drawings which illustrate several embodiments thereof and in which Figure 1 is a side view of an automobile wheel showing my novel cover assembly applied thereto;

Figure 2 is an enlarged fragmentary cross-sectional view taken on substantially the line II—II of Figure 1 looking in the direction indicated by the arrows;

Figure 3 is an enlarged fragmentary rear view of an intermediate portion of the cover which is stressed by an undulated wire; and Figure 4 is a fragmentary cross-sectional view through a modification of the invention and which corresponds substantially with that shown in Figures 4 and 5 of my aforesaid copending patent application.

As shown on the drawings:

In the accompanying drawings I have illustrated more or less a conventional automobile tire and wheel. The pneumatic tire and tube are designated generally by the reference character 9 and are mounted on the usual multi-flange drop-center type of tire rim 10. This tire rim is carried by the customary load-bearing or body part 11, which as is well known in the art, comprises a dished stamping. This part 11 has a bowed central nose portion 12, a rearwardly inclined portion 13 and a radial bolt-on flange 14. The bolt-on flange 14, as is customary, is adapted to be secured to a part on an axle by means of cap screws or bolts (not shown).

Fastened to this flange 14 are a plurality of circumferentially spaced hub cap retaining spring clips 15 which are of the so-called "inverted" type. These clips permit of an "easy on" "hard off" action in the application and removal of the hub cap 16. The hub cap 16 comprises a metallic stamping and includes an underturned skirt 17 terminating in a continuous edge 18 adapted to be cammed over the free extremities of the spring clips into retaining cooperation therewith. The clips may be of any suitable number, such, for example, as three to five.

My present invention is concerned with the provision of a cover for substantially concealing portions of the parts 10 and 11 between the tire 9 and the hub cap 16. The cover is designated generally by the reference character 20 and is in accordance with the features of this invention made of a resiliently pliable material, which may be manually deflected without permanent deformation. In other words, the material is self-sustaining as to shape and upon manual distortion will return to its original shape. I have attained excellent results by making such a cover out of a synthetic plastic, such for example, as ethyl cellulose, cellulose acetate or a vinyl resin.

The cover 20 includes an outer annular bowed portion 21 having an outer turned edge 22 overhanging an outer edge of the rim part 10 in close proximity to the outer side wall of the tire 9. This portion 21 has in it an opening 23 through which a free end of the valve stem 8 can extend in order to afford access to the valve stem without necessitating removal of the cover from the wheel.

The cover portion 21 extends generally radially and axially inwardly from the outer edge 22 to a turned portion 24 adapted to bottom on or rest against the body part 11. The depth and configuration of the portion 21 is such that, in use, it appears to constitute a continuation of the side wall of the tire. This appearance can be accentuated by either making the portion 21 of white plastic or by giving it a white external finish. In that event, the portion 21 will appear to constitute a white side wall part of the tire by which the tire appears to extend clear down to the body part 11.

The turned portion 24 or bend of the cover 20 constitutes the junction between the radially outer portion 21 and a radially inner portion comprising a generally axial flange 25, a radial section 26 and a turned inner margin 27 arranged to embrace the nose 12 of the body part and to be clamped thereagainst by the skirt 17 of the hub cap 16.

In accordance with the objects of this invention, it is the aim to reinforce and ornament the cover 20, and yet, at the same time, provide a very simple means for holding the ornamentation on the cover.

Such an ornamentation may take the form of a hollow convex-concave steel bead 30 arranged to substantially envelop the generally axially extending flange 25 of the cover adjacent the junction or bend 24. In fact, an outer turned edge 31 of this bead 30 is adapted to tightly seat or nest in the bend or turned portion 24. The other edge of the annular bead 30 is likewise turned at 32 and is adapted to overhang the outer side of the flange portion 25.

Heretofore, it has been the practice to provide prongs, fingers, or protuberances for holding such an annular bead 30 on the cover. It is my present object to provide a simpler form of retaining means which does not necessitate any fingers or prongs on the cover and whereby the cover can retain the beads by the stressing of the cover, as described hereinafter. To this end there is provided an undulated continuous wire ring 35 which is of such diameter that when it is pressed into the inner side of the flange 25, it will stress spaced points 36 of the plastic radially outwardly into retaining engagement with the outer edge 31 on the bead 30. In other words, the undulated wire ring 35 is jammed or pressed into the cover in such a manner as to stress an annular portion of the same into retaining cooperation with another part, namely, the bead or metal annulus 30. The annulus 30 is made of stainless steel and provides a very desirable color contrasting effect in the plastic cover 20.

It is also clear that if it is desired to remove or replace the bead 30, the same may be easily effected by forcibly pulling the undulated wire ring 35 out of telescoping relation with the flange 25. In addition, it is contemplated that the anchorage of the ring 35 to the plastic material may be further enhanced by subjecting spaced points of the ring in engagement at points 36 with the plastic (Fig. 3), to heat. In this manner, the radially outer points of the undulated ring 35 may be more firmly imbedded in the plastic to displace spaced points 36 thereof into tight retaining cooperation with the turned edge 31 on the bead. However, while this is an added feature, it is not necessary to the practicing of my invention inasmuch as I find that mere mechanical pressure, such as the manual forcing of the ring into position, is sufficient to cause spaced points 36 of the plastic flange 25 to be bowed radially outwardly against the edge 31.

In Figure 4 I have illustrated a modification of the invention which corresponds substantially to that of Figures 4 and 5 of my aforesaid copending application. In this form of the invention instead of using the undulated or stressed wire ring 35' for holding the cover in contact with a part such as the bead 30, I utilize the undulated wire ring 35' to hold an annular portion of the cover in stressed engagement with a part on the wheel.

In this form the plastic cover is designated generally by the reference character 20' and includes an outer annular portion 21'. The radially inner structure of this plastic cover 20' may be substantially identical to that shown in Figure 3, and hence is not repeated in Figure 4.

The outer margin of the annular portion 21' is turned rearwardly as indicated at 40 and is of such curvature as to be adapted to be nested in an outer turned flange of the tire rim part 10. However, prior to the pressing of the cover 20' home into engagement with the wheel, an undulated continuous wire ring 35' is forced into the interior of the turned margin 40 for stressing points of the same into retaining engagement with the other part, namely, the rim part 10 in this case.

As disclosed in my earlier application, this undulated wire ring 35' is employed to retain the cover 20' on the wheel. However, as noted before if it is so desired, the central portion of the cover 20' may be formed in accordance with the structure shown in Figure 2. It is contemplated, however, that the ring 35' may constitute the sole means for holding the cover portion 21' on the wheel in which event the use of a hub cap for holding the cover on the wheel can be dispensed with.

I claim as my invention:

1. As an article of manufacture a cover for a wheel, comprising a circular member having a generally axially extending annular portion made of resiliently pliable material normally deflectable without permanent deformation, an undulated circular wire on the under surface of said annular portion, and another part encircling the outer surface of said annular portion, said wire resiliently stressing said annular portion in a generally radial direction for attaching said portion to said other part, said other part of said cover comprising an annular bend seated on said annular portion with an edge tightly held on said portion by the stressing of spaced points of the portion by said wire into retaining engagement therewith.

2. As an article of manufacture a cover for a wheel, comprising a circular member having a generally axially extending annular portion made of resiliently pliable material normally deflectable without permanent deformation, an undulated circular wire on the under surface of said annular portion, and another part encircling the outer surface of said annular portion, said wire resiliently stressing said annular portion in a generally radial direction for attaching said portion to said other part, said other part of said cover comprising an annular bead seated on said annular portion with an edge tightly held on said portion by the stressing of spaced points of the portion by said wire into retaining engagement therewith, said portion and bead being located at a bend in the cover for reinforcing said bend for bearing against a part of a wheel.

3. In a cover structure for a wheel including tire rim and body parts, a wheel cover made of resiliently pliable material manually deflectable without permanent deformation and of such depth as to afford substantial coverage for at least portions of said wheel part, said cover including an outer annular portion extending generally radially and axially inwardly for disposition over the rim part and terminating at the body part in a bend leading into an inner radial portion disposed over the body part, an annular bead in said bend of the cover and means for retaining the bead on the cover, comprising a continuous circular undulated wire on the rear side of the cover and stressing portions of the cover at said bend into retaining engagement with said bead.

4. In a wheel structure having a tire rim provided with a generally axially outwardly extending edge portion, said edge portion also having a generally slightly radial inward curvature toward the edge thereof, a circular cover member formed from sheet synthetic plastic material and having physical characteristics enabling it to be self-sustaining and form retaining and yet locally, temporarily flexible, said cover having a generally axially inwardly extending attachment flange at the radially outer margin thereof, said flange being provided with an initial curvature less than that of the radially inner surface of the edge portion of the tire rim, said flange also being adapted for nested engagement against the radially inner surface of the edge portion of the rim when the cover is urged axially inwardly against the wheel so that the flange is distortingly pressed axially inwardly of the hump formed by the edge of the edge portion of the rim and distorted into conforming configuration with the adjacent, curvate, radially inner surface of the edge portion of the rim, and a circular, relatively rigid reinforcing member disposed against the radially inner surface of said flange on the cover member, said reinforcing member being arranged so as to urge the flange radially outwardly against the radially inner surface of the edge portion of the rim and thus into conformity with the same under pressure.

5. In a wheel structure having a generally axially outwardly extending radially inwardly curled attachment portion, a cover member formed from sheet synthetic plastic material so as to have physical characteristics enabling it to be self-supporting as to form and yet locally, temporarily, resiliently flexible, said cover having a generally axially inwardly extending attachment flange cross-sectionally curled less than the attachment portion of the wheel, said attachment flange being adapted to be sprung into conformity with the attachment portion of the wheel structure to be disposed therein in nested engagement under the influence of stresses and pressures exerted by the distortion thereof into conformity with the attachment flange on the wheel, and relatively rigid circular means arranged to expandingly engage the exposed surface of the attachment flange of the cover member to force the same into distorted, nested relationship with the attachment portion of the wheel.

6. In a cover construction of the character described, a continuous annular plastic cover member cross sectionally dimensioned for disposition in concealing relation to the tire rim of a vehicle wheel and having a continuous annular generally axially extending portion, and a continuous annular undulating wire member having a plurality of radial projections bearing against said axially extending portion for pressing it radially against a relatively rigid member engaging the opposite side of the axial portion.

7. In a construction of the character described, an annular plastic cover member having a continuous annular generally axially extending portion, a generally concave annular rigid member opposing one side of said axially extending portion of the plastic cover member, and a continuous undulating wire retaining member having a plurality of prominences opposing the opposite side of said axially extending portion and pressing the same at spaced points engaged by said prominences into the concavity of the rigid annular member whereby to retain the plastic cover member and the rigid annular member in assembled relation.

8. In a wheel structure including a tire rim and a wheel body, a plastic cover member for concealing the tire rim and having a cross sectional configuration generally simulating the side wall of a tire so as to appear as a continuation thereof, said cover member extending from the outer extremity flange of the tire rim to the wheel body, a generally axially extending annular continuous portion on said cover member, a rigid annular member opposing one side of said portion, and an undulating continuous annular wire reinforcing member having a plurality of equally spaced prominences bearing against said axially extending portion and deflecting the same radially against said rigid member.

9. A wheel structure according to claim 8 wherein the axially extending portion of the plastic cover is disposed adjacent to the wheel body and extends axially outwardly therefrom and the reenforcing member comprises a bead of concave cross section engaging the outer side of said axially extending portion, the wire member bearing against the inner side of said axially extending portion and deflecting the same into interlocking relation with the bead.

10. A wheel structure according to claim 8 wherein the axially extending portion of the wheel cover is formed at the outer margin thereof and the rigid member comprises the extremity flange of the tire rim and the wire member holds the axially extending portion in internested relation with said flange by deflecting the same radially outwardly thereagainst.

GEORGE ALBERT LYON.

REFERENCES CITED

The following references are of record in the file of this patent:

UNITED STATES PATENTS

| Number | Name | Date |
| --- | --- | --- |
| 469,484 | Maris | Feb. 23, 1892 |
| 1,765,239 | Meurling | June 17, 1930 |